US008166326B2

(12) United States Patent
Pagan

(10) Patent No.: US 8,166,326 B2
(45) Date of Patent: Apr. 24, 2012

(54) MANAGING POWER CONSUMPTION IN A COMPUTER

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 11/936,903

(22) Filed: Nov. 8, 2007

(65) Prior Publication Data

US 2009/0125730 A1 May 14, 2009

(51) Int. Cl.
*G06F 1/32* (2006.01)
(52) U.S. Cl. ........................................ 713/324; 713/320
(58) Field of Classification Search .................. 713/324, 713/320
See application file for complete search history.

(56) References Cited

U.S. PATENT DOCUMENTS

| | | |
|---|---|---|
| 3,602,703 A | 8/1971 | Polenz |
| 5,623,450 A | 4/1997 | Phillips et al. |
| 5,630,148 A | 5/1997 | Norris |
| 5,719,800 A | 2/1998 | Mittal et al. |
| 5,745,375 A | 4/1998 | Reinhardt et al. |
| 5,812,860 A | 9/1998 | Horden et al. |
| 5,941,991 A | 8/1999 | Kageshima |
| 6,002,878 A | 12/1999 | Gehman et al. |
| 6,038,636 A | 3/2000 | Brown, III et al. |
| 6,125,334 A | 9/2000 | Hurd |
| 6,141,021 A | 10/2000 | Bickford et al. |
| 6,385,113 B1 * | 5/2002 | Longwell et al. ............. 365/222 |
| 6,513,145 B1 | 1/2003 | Venkitakrishnan |
| 6,624,816 B1 | 9/2003 | Jones, Jr. |
| 6,628,469 B1 | 9/2003 | Hoyt |
| 6,657,634 B1 | 12/2003 | Sinclair et al. |
| 6,661,671 B1 | 12/2003 | Franke et al. |
| 6,665,806 B1 * | 12/2003 | Shimizu ........................ 713/324 |
| 6,766,420 B2 | 7/2004 | Rawson, III |
| 6,795,896 B1 * | 9/2004 | Hart et al. ..................... 711/118 |
| 6,820,222 B2 | 11/2004 | Swoboda |
| 6,862,672 B1 | 3/2005 | Furudate et al. |

(Continued)

FOREIGN PATENT DOCUMENTS

DE 20 2004 018 289 3/2005

(Continued)

OTHER PUBLICATIONS

Pisharath, et al; Reducing Energy Consumption of Queries in Memory-Resident Database Systems; International Conference on Compilers, Architectures and Synthesis of Embedded Systems; Sep. 23, 2004.

(Continued)

*Primary Examiner* — Chun Cao
(74) *Attorney, Agent, or Firm* — Edward J. Lenart; Cynthia G. Seal; Biggers & Ohanian, LLP.

(57) ABSTRACT

Methods, apparatus, and products are disclose for managing power consumption in a computer, the computer including random access memory ('RAM') implemented in two or more memory modules, the computer having installed upon it an operating system, the operating system including a power management module, that includes: freeing, by the operating system from one or more of the memory modules, at least the amount of allocated memory in one memory module; selecting, by the operating system, at least one memory module to power down; moving, by the operating system, content of the selected memory module to other memory modules; and powering, by the operating system, down the selected memory module.

18 Claims, 3 Drawing Sheets

U.S. PATENT DOCUMENTS

| | | | |
|---|---|---|---|
| 6,916,815 B2 | 7/2005 | Vite et al. | |
| 7,002,884 B2 | 2/2006 | Schmidt et al. | |
| 7,010,656 B2* | 3/2006 | Gupta | 711/165 |
| 7,036,030 B1 | 4/2006 | Altmejd | |
| 7,043,647 B2 | 5/2006 | Hansen et al. | |
| 7,069,463 B2 | 6/2006 | Oh | |
| 7,134,011 B2 | 11/2006 | Fung | |
| 7,155,621 B2 | 12/2006 | Dai | |
| 7,155,623 B2 | 12/2006 | Lefurgy et al. | |
| 7,219,241 B2 | 5/2007 | Cooper et al. | |
| 7,240,225 B2 | 7/2007 | Brewer et al. | |
| 7,284,067 B2 | 10/2007 | Leigh | |
| 7,318,164 B2 | 1/2008 | Rawson, III | |
| 7,345,689 B2 | 3/2008 | Janus et al. | |
| 7,444,526 B2 | 10/2008 | Felter et al. | |
| 7,516,348 B1 | 4/2009 | Ofer | |
| 7,581,130 B2 | 8/2009 | Carroll et al. | |
| 7,788,513 B2* | 8/2010 | Vaden et al. | 713/320 |
| 2001/0032298 A1 | 10/2001 | Emons | |
| 2002/0004912 A1 | 1/2002 | Fung | |
| 2002/0087896 A1 | 7/2002 | Cline et al. | |
| 2002/0133792 A1 | 9/2002 | Raghunathan et al. | |
| 2003/0023825 A1* | 1/2003 | Woo et al. | 711/170 |
| 2003/0051104 A1* | 3/2003 | Riedel | 711/154 |
| 2003/0056125 A1 | 3/2003 | O'Conner et al. | |
| 2003/0105984 A1 | 6/2003 | Masuyama et al. | |
| 2003/0112582 A1 | 6/2003 | Sanders et al. | |
| 2003/0115495 A1 | 6/2003 | Rawson, III | |
| 2003/0117759 A1 | 6/2003 | Cooper | |
| 2003/0120772 A1 | 6/2003 | Husain et al. | |
| 2003/0125886 A1 | 7/2003 | Spitaels et al. | |
| 2003/0188222 A1 | 10/2003 | Abbondanzio et al. | |
| 2003/0229821 A1 | 12/2003 | Ma | |
| 2004/0003303 A1 | 1/2004 | Oehler et al. | |
| 2004/0024831 A1 | 2/2004 | Yang et al. | |
| 2004/0030939 A1 | 2/2004 | Barr et al. | |
| 2004/0030941 A1 | 2/2004 | Barr et al. | |
| 2004/0148060 A1 | 7/2004 | Lee | |
| 2004/0243886 A1 | 12/2004 | Klein | |
| 2004/0268166 A1 | 12/2004 | Farkas et al. | |
| 2005/0015632 A1 | 1/2005 | Chheda et al. | |
| 2005/0060590 A1 | 3/2005 | Bradley et al. | |
| 2005/0060591 A1 | 3/2005 | Yoshiyama et al. | |
| 2005/0102544 A1 | 5/2005 | Brewer et al. | |
| 2005/0134593 A1 | 6/2005 | Janus et al. | |
| 2005/0138438 A1 | 6/2005 | Bodas | |
| 2005/0229226 A1 | 10/2005 | Relan et al. | |
| 2005/0244131 A1 | 11/2005 | Uehara | |
| 2005/0262365 A1 | 11/2005 | Lint et al. | |
| 2005/0289361 A1 | 12/2005 | Sutardja | |
| 2005/0289362 A1 | 12/2005 | Merkin et al. | |
| 2005/0289367 A1 | 12/2005 | Clark et al. | |
| 2006/0007203 A1 | 1/2006 | Chen et al. | |
| 2006/0156041 A1 | 7/2006 | Zaretsky et al. | |
| 2006/0161794 A1 | 7/2006 | Chiasson et al. | |
| 2006/0190745 A1 | 8/2006 | Matsushima et al. | |
| 2006/0230299 A1 | 10/2006 | Zaretsky et al. | |
| 2006/0248354 A1 | 11/2006 | Pineda De Gyvez et al. | |
| 2006/0248356 A1 | 11/2006 | Won et al. | |
| 2006/0253715 A1 | 11/2006 | Ghiasi et al. | |
| 2007/0033425 A1 | 2/2007 | Clark | |
| 2007/0073969 A1 | 3/2007 | Guha et al. | |
| 2007/0162632 A1 | 7/2007 | Ng et al. | |
| 2007/0162692 A1 | 7/2007 | Nishimoto et al. | |
| 2007/0162776 A1 | 7/2007 | Carpenter et al. | |
| 2007/0245161 A1 | 10/2007 | Shaw et al. | |
| 2007/0260897 A1 | 11/2007 | Cochran et al. | |
| 2008/0018653 A1 | 1/2008 | Liu | |
| 2008/0077817 A1 | 3/2008 | Brundridge et al. | |
| 2008/0094403 A1 | 4/2008 | Bakalash et al. | |
| 2008/0204460 A1 | 8/2008 | Marinkovic et al. | |
| 2008/0229050 A1* | 9/2008 | Tillgren | 711/200 |
| 2008/0320203 A1* | 12/2008 | Fitzgerald | 711/5 |
| 2009/0070611 A1 | 3/2009 | Bower et al. | |
| 2009/0089595 A1 | 4/2009 | Brey et al. | |
| 2009/0132842 A1 | 5/2009 | Brey et al. | |

FOREIGN PATENT DOCUMENTS

| | | | |
|---|---|---|---|
| WO | WO 2005/069148 | * | 7/2005 |
| WO | WO 2007/140404 | | 12/2007 |

OTHER PUBLICATIONS

Pinheiro, et al.; Load Balancing and Unbalancing for Power and Performance in Cluster-Based Systems; pp. 4-1-4-8; Department of Computer Science, Rutgers University; Piscataway, NJ.

Soteriou, et al.; Software-Directed Power-Aware Interconnection Networks; Department of Electrical Engineering, Princeton University; Sep. 24-27, 2005; pp. 274-285; Cases 2005; Princeton, NJ.

Koyangi et al.; Control of Spindle Motor Velocity in Load/Unload Hard Disk Drive; TDB v38 n12 Dec. 1995 p. 551-552; AAA95A062553; Japan.

Luecke; High-Speed/Low-Power Selectable Optical File; Research Disclosure n315; Jul. 1990; AAA90A963914; San Jose.

Otteson; Adaptive Just-In-Time Velocity profile Algorithm for Power Savings in a Direct Access Storage Device; TDB v41 n1 Jan. 1998 p. 733-736; AAA98A060205; Rochester, MN.

Mitchell; Memory: The New Power Hog; www.techworld.com/features/index.cfm?featureID=3337; Apr. 2007.

Dhiman et al.; Dynamic Power Management Using Machine Learning; ICCAD'06; Nov. 2006; ACM 1-59593-389-1/06/0011; San Jose CA, USA.

Watts, et al.; Engineering Economics, Section 5, Chapter 7, SFPE Handbook of Fire Protection Engineering, NFPA, Quincy, MA 2002.

http://ati.amd.com/technology/hybridgraphics/index.html.

PCT Search Report and Written Opinion, Oct. 21, 2010; PCT Application No. PCT/EP2009/064818.

PCT Search Report, Feb. 22, 2010; PCT Application No. PCT/EP2009/057910.

Compaq Computer Corporation, et al. Advanced Configuration and Power Interface Specification Rev 2.0; Jul. 27, 2000; pp. 1-27 and 211-230.

Office Action, U.S. Appl. No. 11/285,325, Mar. 18, 2008.

Notice of Allowance, U.S. Appl. No. 11/285,325, Jul. 25, 2008.

Office Action, U.S. Appl. No. 11/946,506, Jul. 21, 2009.

Final Office Action, U.S. Appl. No. 11/946,506, Feb. 22, 2010.

Office Action, U.S. Appl. No. 11/946,506, Nov. 28, 2007.

Office Action, U.S. Appl. No. 11/859,829, Apr. 7, 2010.

Office Action, U.S. Appl. No. 11/946,506, Nov. 22, 2010.

Office Action, U.S. Appl. No. 11/940,896, Jun. 29, 2010.

Office Action, U.S. Appl. No. 11/940,896, Dec. 3, 2010.

Final Office Action, U.S. Appl. No. 11/940,896, Apr. 6, 2011.

Final Office Action, U.S. Appl. No. 11/946,506, Apr. 11, 2011.

Office Action, U.S. Appl. No. 12/146,085, May 19, 2011.

Office Action, U.S. Appl. No. 12/269,160, Oct. 7, 2011.

* cited by examiner

MANAGING POWER CONSUMPTION IN A COMPUTER

BACKGROUND OF THE INVENTION

1. Field of the Invention

The field of the invention is data processing, or, more specifically, methods, apparatus, and products for managing power consumption in a computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In order to deliver powerful computing resources, computer architects must design powerful computer processors and high-speed memory modules. Current computer processors, for example, are capable of executing billions of computer program instructions per second. Operating these computer processors and memory modules requires a significant amount of power, and often processors can consume over 100 watts during operation. As computer become more and more dependent on battery power for portability and as computer architects design environmentally-sensitive computers that use less energy, readers will appreciate any improvements for managing power consumption in a computer.

SUMMARY OF THE INVENTION

Methods, apparatus, and products are disclose for managing power consumption in a computer, the computer including random access memory ('RAM') implemented in two or more memory modules, the computer having installed upon it an operating system, the operating system including a power management module, that includes: freeing, by the operating system from one or more of the memory modules, at least the amount of allocated memory in one memory module; selecting, by the operating system, at least one memory module to power down; moving, by the operating system, content of the selected memory module to other memory modules; and powering, by the operating system, down the selected memory module.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
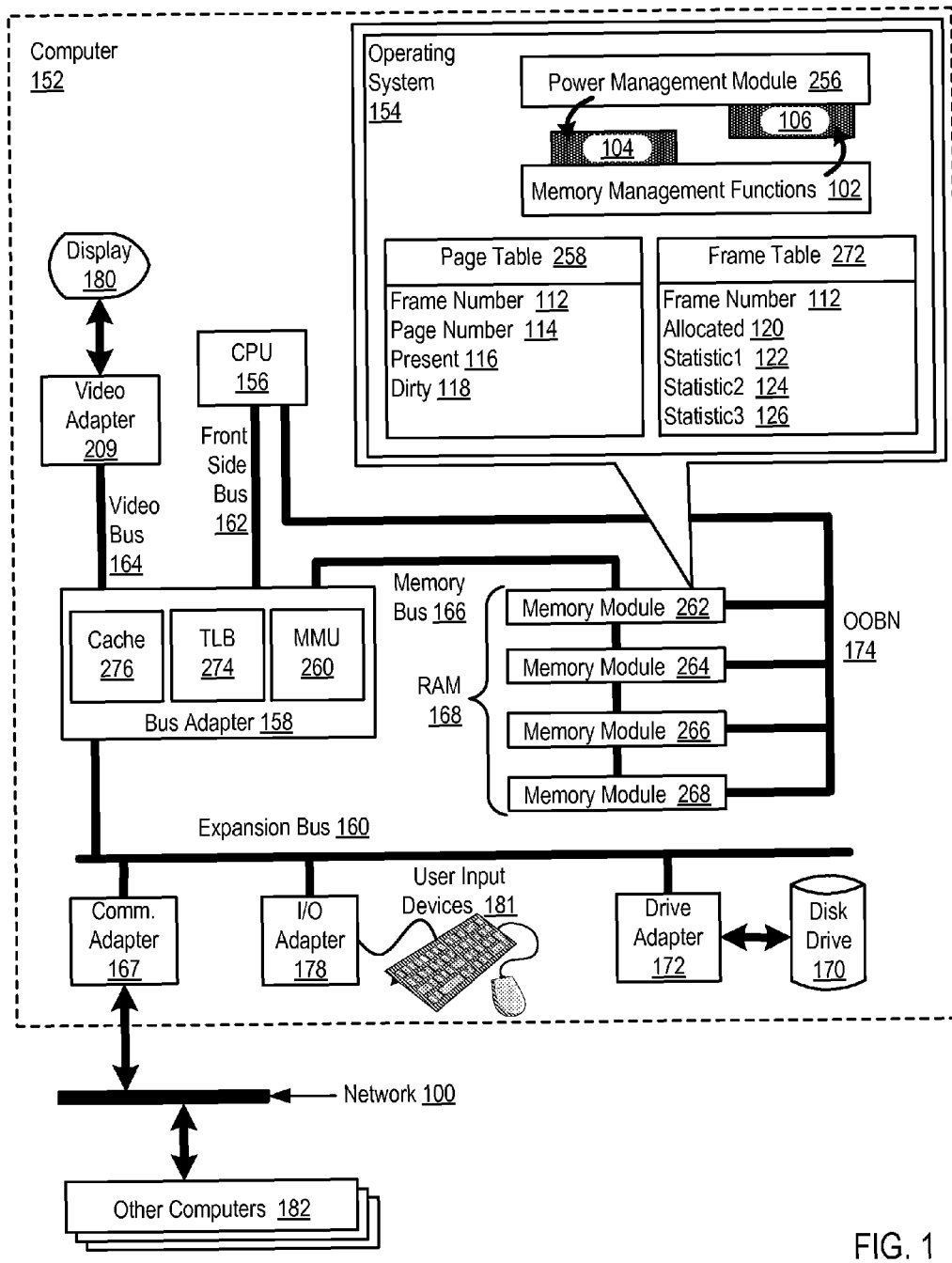
FIG. 1 sets forth a block diagram of an exemplary computer for managing power consumption in a computer according to embodiments of the present invention.

Exemplary methods, apparatus, and products for managing power consumption in a computer in accordance with the present invention are described with reference to the accompanying drawings, beginning with FIG. 1. FIG. 1 sets forth a block diagram of automated computing machinery comprising an exemplary computer (152) useful in managing power consumption in a computer according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). In this example, the RAM (168) is implemented in two or more memory modules (262, 264, 266, 268). A memory module is a group of RAM integrated circuits mounted on a printed circuit board. A memory module may be implemented as a single in-line memory module ('SIMM'), dual in-line memory module ('DIMM'), and in other form factors as will occur to those of skill in the art.

Stored in RAM (168) is an operating system (154) that includes a power management module (256), a page table (258), and a frame table (272). The operating system (154) also includes a set of memory management functions (102) that allocate memory, free memory, select memory modules for powering down, move contents of memory from module to module, disk to module, or module to disk, and so on. The memory management functions (102) expose an application programming interface ('API') (104) through which the power management module (256) can access the memory management functions (102) of the operating system (154). Operating systems that may be improved for managing power consumption in a computer according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

In the example of FIG. 1, the power management module (256) is a module of computer program instructions that carry out, in coordination with the memory management functions (102) of the operating system (154), power management in accordance with embodiments of the present invention. To facilitate such coordination, the power management module (256) exposes an API (106) through which the memory management functions (102) of the operating system (154) may communicate with the power management module (256).

The page table (258) of FIG. 1 is used by a virtual memory system in the operating system (154) to store a mapping between virtual memory addresses and physical memory addresses in main memory. The mapping between virtual addresses and physical addresses in the example of FIG. 1 is represented by virtual address page numbers (114) and physical address frame numbers (112) respectively. The page table (258) in the exemplary computer (152) of FIG. 1 also includes additional information about a memory page, such as, for example, whether the memory page is presently in RAM (168). Whether the page is presently in RAM is represented in this example by a present bit (116) on each entry in the page table. The example page table in FIG. 1 also includes, in the form of a dirty bit (118) an indication whether a page has been modified after the page was loaded into RAM (168). A memory page that has been modified is written back to a disk (170) in order to preserve any changes. Readers will note that the exemplary page table (258) of FIG. 1 is for explanation and not for limitation. Other page tables having other formats as will occur to those of skill in the art may also be useful in managing power consumption in a computer according to embodiments of the present invention.

The frame table (272) of FIG. 1 is also used by a virtual memory system in an operating system (154). The frame table (272) records which frames of physical memory are free to be mapped to pages of virtual memory using an allocated bit (120). A frame of physical memory is allocated when the frame is mapped to a page of virtual memory, and a frame of physical memory is unallocated when the frame is not mapped to a page of virtual memory. In some operating systems the frame table (272) may also hold additional information, such as, for example, statistical information, or other background information. Such statistical information may be implemented as, for example, the number of times that a frame is accessed, an indication of when the frame was last accessed, and so on. The statistical information may be stored in the frame table (272) as statistic1 (122), statistic2 (124), and statistic3 (126) associated with the frame number (112). Readers will note that the exemplary frame table (272) of FIG. 1 is for explanation and not for limitation. Other frame tables having other formats as will occur to those of skill in the art may also be useful in managing power consumption in a computer according to embodiments of the present invention.

In the example of FIG. 1, the operating system (154) operates generally at the behest of the power management module (256) in this example to manage power consumption on the computer (152) by:

freeing, from one or more of the memory modules, at least the amount of allocated memory in one memory module;
  selecting at least one memory module to power down;
  moving the content of the selected memory module to other memory modules; and
  powering down the selected memory module.

Upon request from the power management module (256) in the example of FIG. 1, the memory management functions (102) of the operating system (154) may free at least the amount of allocated memory in one memory module by invalidating entries in the page table (258) for a number of frames whose combined size is at least the amount of allocated memory in one memory module and, for each page table entry number so invalidated, writing the contents of a corresponding frame to disk (170) if the contents were changed since the contents were stored in the corresponding frame. A request from the power management module (256) is an instruction from the power management module (256) to the memory management functions (102) of the operating system (154) to make a memory module available for powering down. The memory management functions (102) may identify the amount of allocated memory in one memory module by scanning the frame table (272) to identify the number of entries for that memory module's frames in which the allocated bit (120) is set and multiplying the number of entries identified times the size of each frame. The memory management functions (102) may invalidate entries in a page table by resetting the present bit (116) in each page table entry to be invalidated to indicate that a memory page corresponding to that entry is not loaded into RAM (168). Whether the contents of a corresponding frame need to be written to disk (170) is determined by reading the status of a dirty bit (118) in the page table entry to be invalidated because, as mentioned above, a dirty bit (118) that is set indicates that the contents of the corresponding frame in main memory have changed after loading the frame into main memory.

In the example of FIG. 1, upon request from the power management module (256), the memory management functions (102) of the operating system (154) may select at least one memory module to power down by selecting a memory module that bears, in comparison with other memory modules, the largest amount of free memory after freeing at least the amount of allocated memory in one memory module from one or more of the memory modules. The memory management functions (102) may identify the memory module that bears the largest amount of free memory in comparison with other memory modules by scanning the frame table (272) to identify the number of entries for each memory module in which the allocated bit (120) is not set. The memory module having the most entries in the frame table (272) in which the allocated bit (120) is not set is the memory module that bears the largest amount of free memory in comparison with other memory modules.

Upon request from the power management module (256) in the example of FIG. 1, the memory management functions (102) of the operating system (154) may move the content of the selected memory module to other memory modules by, for each frame in the selected memory module having a valid entry in a page table: selecting, from a list of free frames, a new frame from a memory module other than the selected memory module; copying to the new frame the contents of a frame in the selected memory module; and replacing in the page table (258) the frame number of the frame in the selected module with the frame number of the new frame. The new frame is a frame of physical memory in one of the memory modules not selected to be powered down.

When a frame in the selected module having contents moved to a new frame in another memory module is referenced in a translation lookaside buffer ('TLB') (274) and cache memory (276), the memory management functions (102) may also update the TLB (274) and cache memory (276) to reflect that the content of the frame is moved to another memory module. The TLB (274) is a table that stores a subset of the entries in the page table, typically the most recently accessed entries in the page table by the virtual memory subsystem, for faster access than is normally achieved when accessing entries from the page table. Similarly, the cache memory (276) of FIG. 1 stores the contents for a subset of the frames of RAM (168) for faster access by the CPU (156) than is normally achieved when accessing frame contents from RAM (168). When a frame in the selected module having contents moved a new frame in another memory module is referenced in the TLB (274) or the cache memory (276), the memory management functions (102) may move the content of the selected memory module to other memory modules by adjusting entries in a translation lookaside buffer as needed to reflect the use of the new frame as storage for the contents of the frame in the selected memory module and adjusting entries in cache memory as needed to reflect the use of the new frame as storage for the contents of the frame in the selected memory module.

In the example of FIG. 1, the operating system (154), upon request from the power management module (256), may power down the selected memory module by instructing the CPU (156) to turn off power to the selected memory module through an out of band network ('OOBN') (174). The OOBN (174) may be implemented as an $I^2C$ bus, for example, a multi-master serial computer bus invented by Philips that is used to attach low-speed peripherals to a motherboard or an embedded system. I²C is a simple, low-bandwidth, short-distance protocol that employs only two bidirectional open-drain lines, Serial Data (SDA) and Serial Clock (SCL), pulled up with resistors. Through the OOBN (174), the CPU (156) controls the memory modules (262, 264, 266, 268) individually. Although the exemplary computer (152) utilizes the I²C protocol, readers will note this is for explanation and not for limitation. In addition to the I²C protocol, the OOBN (174) may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on. Furthermore, readers will note that although the operating system (154) may power down the selected memory module using the CPU, other components may be configured to control power to the memory modules (262, 264, 266, 268) such as, for example, a baseboard management controller ('BMC'). A BMC is a specialized microcontroller that may be embedded on the motherboard of a computer to manage the interface between system management software and the platform hardware.

In the example of FIG. 1, the operating system (154), upon request from the power management module (256), may also power down the selected memory module by instructing a memory management unit ('MMU') of the computer to remove the selected memory module from use. An MMU is a computer component responsible for handling access requests by a CPU to a computer's memory. An MMU performs translation of virtual addresses to physical addresses, memory protection, cache control, bus arbitration, and so on. The operating system (154) may instruct a memory management unit ('MMU') of the computer to remove the selected memory module from use by setting register values in the MMU to prevent access to frames of physical memory in the memory module selected for power removal.

As mentioned above, the operating system (154) of FIG. 1 operates to manage the power consumption in the computer (152) according to embodiments of the present invention at the behest of a power management module (256). In the example of FIG. 1, the power management module (256) may operate generally for managing power consumption in the computer (152) by determining whether to power down a memory module in dependence upon system performance of the computer (152). The power management module (256) may determine whether to power down a memory module by comparing a performance metric representing system performance with a predetermined threshold for that performance metric. System performance represents the operational state of the computer and may include, for example, memory usage, hard page-faults per second, and many others. A performance metric that represents memory usage may be implemented as a ratio of the amount of allocated memory in RAM to the size of the page file used to store contents of RAM that are swapped to a disk. The smaller ratio value, the higher the probability that not all main memory is currently in use and that powering down a memory module will not degrade overall computer performance. A performance metric that represents a hard page-fault per second may be implemented as the number of times per second that a CPU (156) requests access to a page of memory that is not loaded in RAM (168). The lower the value for the performance metric representing a hard page-fault per second, the higher the probability that not all main memory is currently in use and that powering down a memory module will not degrade overall computer performance.

In the example of FIG. 1, the bus adapter (158) includes an MMU (260), a TLB (274), and memory cache (276). As mentioned above, the MMU (260) translates virtual memory addresses specified by the CPU (156) into physical memory addresses. The MMU (260) performs this translation process by identifying the virtual memory page number using the most significant bits of the virtual memory address and looking up the frame number that corresponds with the page number in the TLB (274). The least significant bits of the virtual memory address form an offset, which when appended to the page number's corresponding frame number form the physical memory address. If the MMU (260) does not locate the page number in the TLB (274), then the MMU (260) looks up the frame number that corresponds with the page number in the page table (258). After identifying the frame number, the MMU (260) determines whether the content of the frame specified by the frame number are located in cache memory (276). If the content of the frame specified by the frame number are located in cache memory (276), the MMU (260) provides the frame contents to the CPU (156) from the cache (276). If the content of the frame specified by the frame number are not located in cache (276), the MMU (260) either provides the frame contents to the CPU (156) from RAM (168) or triggers a page fault interrupt to have the operating system retrieving the frame contents from disk (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for managing power consumption in a computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for managing power consumption in a computer according to embodiments of the present invention include modems for wired dial-up communications, Ethernet (IEEE 802.3) adapters for wired data communications network communications, and 802.11 adapters for wireless data communications network communications.

The arrangement components making up the exemplary computer (152) illustrated in FIG. 1 are for explanation, not for limitation. Computers useful according to various embodiments of the present invention may include additional components, data communications buses, or other computer architectures, not shown in FIG. 1, as will occur to those of skill in the art. In such a manner, various embodiments of the present invention may be implemented on a variety of hardware platforms in addition to those illustrated in FIG. 1.

Figure 2:
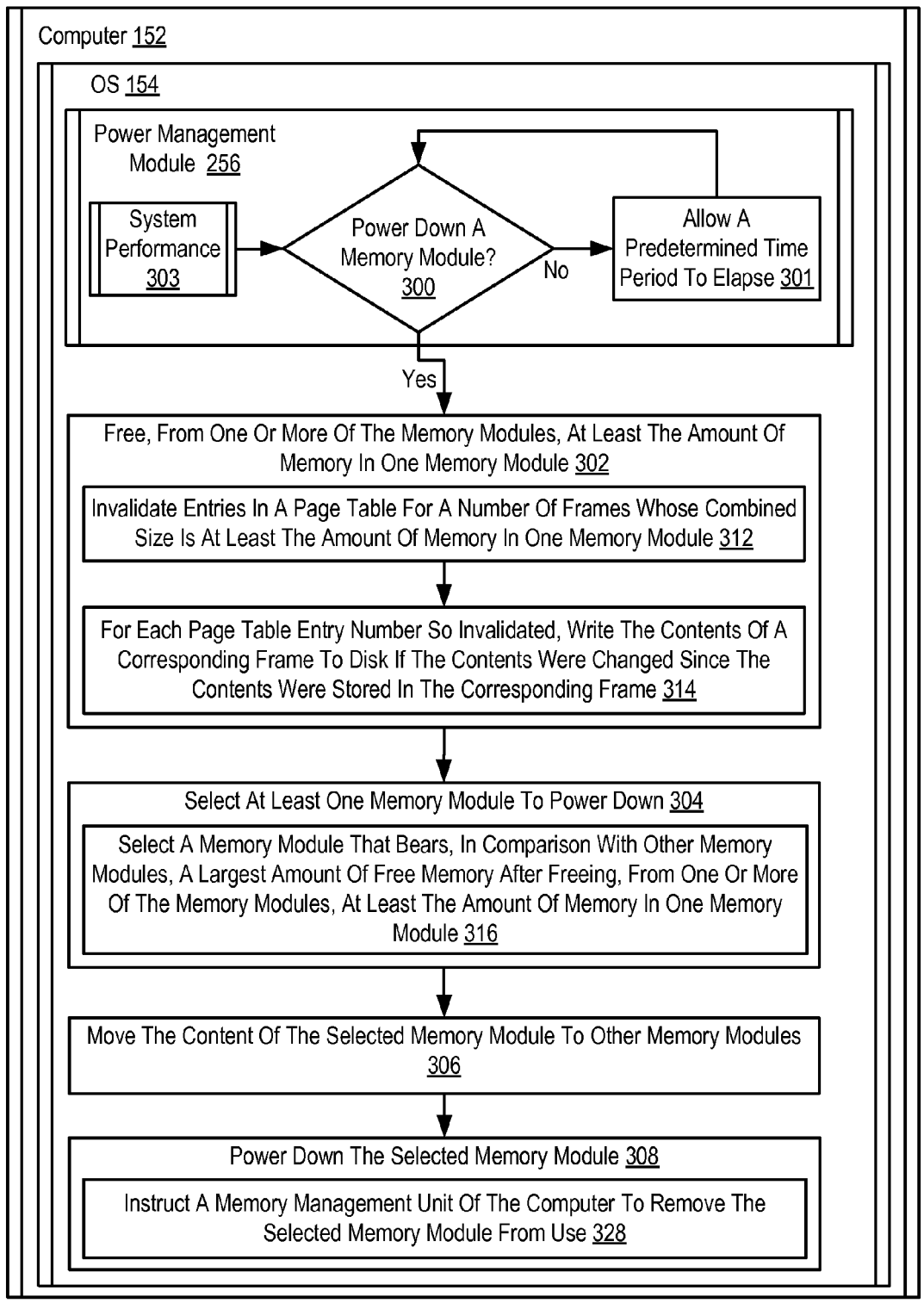
FIG. 2 sets forth a flow chart illustrating an exemplary method of managing power consumption in a computer according to embodiments of the present invention.

For further explanation, FIG. 2 sets forth a flow chart illustrating an exemplary method for managing power consumption in a computer according to embodiments of the present invention. The exemplary method of FIG. 2 is implemented by an operating system (154) of the computer (152) at the behest of a power management module (256) of the operating system (154).

The method of FIG. 2 includes determining (300), by a power management module (256), whether to power down a memory module in dependence upon system performance (303) of the computer (152). The power management module (256) may determine (300) whether to power down a memory module according to the method of FIG. 2 by comparing a performance metric representing system performance with a predetermined threshold for that performance metric. When the performance metric reaches a predetermined threshold, the power management module (256) may determine to power down a memory module. If the performance metric does not reach the predetermined threshold, however, the power management module (256) may determine not to power down a memory module.

The system performance (303) of FIG. 2 represents the operational state of the computer (152). As mentioned above, system performance may be implemented as memory usage, hard page-faults per second, or others as will occur to those of skill in the art. A performance metric that represents memory usage may be implemented as a ratio of the amount of allocated memory in RAM to the size of the page file used to store contents of RAM that are swapped to a disk. The smaller ratio value, the higher the probability that not all main memory is currently in use and that powering down a memory module will not degrade overall computer performance. A performance metric that represents a hard page-fault per second may be implemented as the number of times per second that a CPU (156) requests access to a page of memory that is not loaded in RAM (168). The lower the value for the performance metric representing a hard page-fault per second, the higher the probability that not all main memory is currently in use and that powering down a memory module will not degrade overall computer performance.

In addition, system performance (303) may also be implemented as power utilization for the system. In such an example, the power management module (256) may determine (300) whether to power down a memory module according to the method of FIG. 2 by comparing a performance metric representing the system's power utilization with a predetermined threshold in a power policy. When the power utilization reaches the predetermined threshold in the power policy, the power management module (256) may determine to power down a memory module. If the power utilization does not reach the predetermined threshold in the power policy, however, the power management module (256) may determine not to power down a memory module.

The method of FIG. 2 also includes allowing (301), by the power management module (256), a predetermined time period to elapse if the power management module (256) determines not to power down a memory module. The power management module (256) may allow (301) a predetermined time period to elapse according to the method of FIG. 2 by setting the length of the predetermined time period as a value for a counter, instructing the counter to begin counting down to zero from the counter value, and detecting when the counter reaches zero. Upon detecting that the counter value has reached zero, the power management module (256) may again determine (300) whether to power down a memory module in dependence upon system performance of the computer (152).

The method of FIG. 2 includes freeing (302), from one or more of the memory modules, at least the amount of allocated memory in one memory module. Freeing (302) at least the amount of allocated memory in one memory module according to the method of FIG. 2 may be carried out by identifying the amount of allocated memory in one memory module. Identifying the amount of allocated memory in one memory module may be carried out by scanning the frame table to identify the number of entries for that memory module's frames in which the allocated bit is set and multiplying the number of entries identified times the size of each frame. In the method of FIG. 2, freeing (302) at least the amount of allocated memory in one memory module includes invalidating (312) entries in a page table for a number of frames whose combined size is at least the amount of allocated memory in one memory module, and for each page table entry number so invalidated, writing (314) the contents of a corresponding frame to disk (170) if the contents were changed since the contents were stored in the corresponding frame.

Invalidating (312) entries in a page table (258) according to the method of FIG. 2 may be carried out by selecting page table entries to invalidate and resetting the present bit (explained in detail above with reference to FIG. 1) in each page table entry to be invalidated to indicate that a memory page corresponding to that entry is not loaded into RAM (168). Selecting page table entries to invalidate in the page table may be carried out using any number of algorithms as will occur to those of skill in the art such as, for example, a Least Recently Used ('LRU') algorithm or a First In First Out ('FIFO') algorithm. An LRU algorithm selects the page of memory that has been least recently used by the CPU because typically pages of memory that have been most recently used by the CPU in the previous instructions are most likely to be used by the CPU in the next few instructions. In contrast, a FIFO algorithm selects the page of memory that has been in main memory the longest in time.

Writing (314), for each page table entry to be invalidated, the contents of a corresponding frame in main memory to disk (170) according to the method of FIG. 2 is carried out if the contents were modified after the contents were stored in main memory. In the method of FIG. 2, writing (314), for each page table entry to be invalidated, the contents of a corresponding frame in main memory to disk (170) may be carried out by retrieving the value of the dirty bit for that page table entry and copying the contents of the frame in main memory corresponding to that page table entry to non-volatile storage if the dirty bit is set. Readers will recall from above that a dirty bit which is set indicates that the content of the corresponding frame in main memory have changed after loading the frame contents into main memory.

The method of FIG. 2 also includes selecting (304) at least one memory module to power down. In the method of FIG. 2, selecting (304) at least one memory module to power down includes selecting (316) a memory module that bears, in comparison with other memory modules, a largest amount of free memory after freeing (302), from one or more of the memory modules, at least the amount of allocated memory in one memory module. Selecting (316) a memory module that bears, in comparison with other memory modules, a largest amount of free memory after freeing (302), from one or more of the memory modules, at least the amount of allocated memory in one memory module according to the method of FIG. 2 may be carried out by scanning the frame table to identify the number of entries for each memory module in which the allocated bit is not set and selecting the memory module having the most entries in the frame table in which the allocated bit is not set. Readers will recall from above that the allocated bit indicates whether frames of physical memory are free to be mapped to pages of virtual memory.

The method of FIG. 2 also includes moving (306) the content of the selected memory module to other memory modules. Moving (306) the content of the selected memory module to other memory modules according to the method of FIG. 2 may be carried out by copying the contents of each frame of memory still in use in the selected module after freeing (302) an amount of memory into available frames of the remaining other memory modules and updating the page table and the frame table used by the operating system (154) to reflect that the contents were moved.

The method of FIG. 2 includes powering down (308) the selected memory module. Powering down (308) the selected memory module according to the method of FIG. 2 may be carried out by instructing the CPU or some other electronic component to turn off power to the selected memory module through an out of band network. The out of band network may be implemented, for example, as an I²C bus, an IPMI bus, a System Management Bus, a JTAG bus specification, or any other out of band network as will occur to those of skill in the art. In the method of FIG. 2, powering down (308) the selected memory module includes instructing (328) a memory management unit of the computer (152) to remove the selected memory module from use. Instructing (328) a memory management unit of the computer (152) to remove the selected memory module from use may be carried out by setting register values in the MMU to prevent access to frames of physical memory in the memory module selected for power removal.

Figure 3:
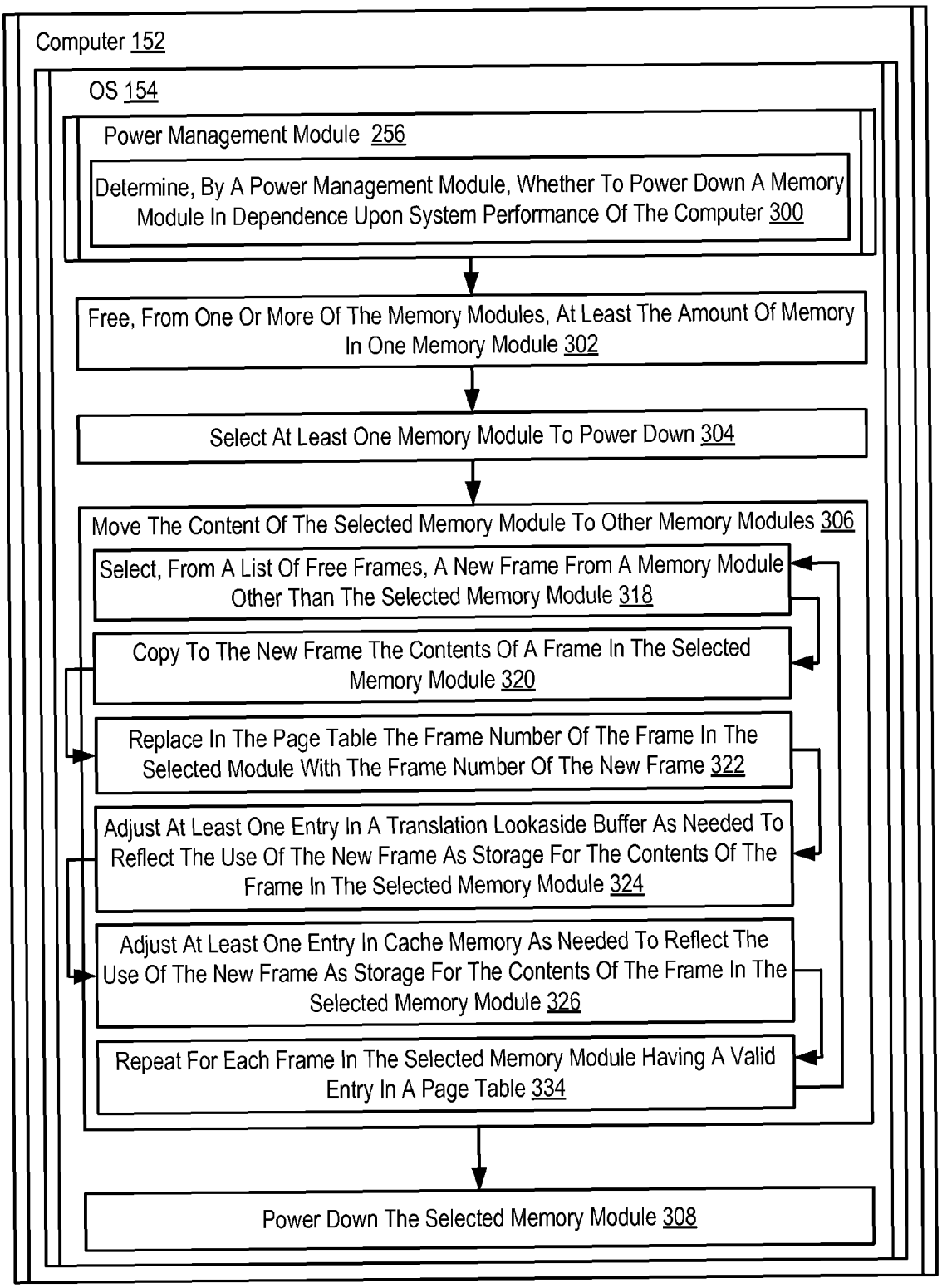
FIG. 3 sets forth a flow chart illustrating a further exemplary method of managing power consumption in a computer according to embodiments of the present invention.

For further explanation of moving content of the selected memory module to other memory modules, FIG. 3 sets forth a flow chart illustrating a further exemplary method for managing power consumption in a computer according to embodiments of the present invention. The method of FIG. 3 is similar to the method of FIG. 2 in that the method of FIG. 3 includes: determining (300), by the power management module (256) in dependence upon system performance of the computer (152), whether to power down a memory module; freeing (302), from one or more of the memory modules, at least the amount of allocated memory in one memory module; selecting (304) at least one memory module to power down; moving (306) the content of the selected memory module to other memory modules; and powering down (308) the selected memory module.

In the method of FIG. 3, however, moving (306) the content of the selected memory module to other memory modules includes, for each frame in the selected memory module having a valid entry in a page table, selecting (318), from a list of free frames, a new frame from a memory module other than the selected memory module, copying (320) to the new frame the contents of a frame in the selected memory module, and replacing (322) in the page table the frame number of the frame in the selected module with the frame number of the new frame. The new frame represents a frame of physical memory in one of the memory modules not selected for powering down.

Selecting (318), from a list of free frames, a new frame from a memory module other than the selected memory module according to the method of FIG. 3 may be carried out by scanning the frame table for an entry for a memory module other than the selected memory module in which the allocated bit is not set and selecting the new frame as the frame corresponding to the frame table entry in which the allocated bit is not set. Readers will recall from above that the allocated bit in a frame table entry indicates whether the corresponding frame of physical memory is mapped to a page of virtual memory. Copying (320) to the new frame the contents of a frame in the selected memory module according to the method of FIG. 3 may be carried out by retrieving the contents from the frame in the selected memory module and storing the contents in the new frame in another memory module. Replacing (322) in the page table the frame number of the frame in the selected module with the frame number of the new frame according to the method of FIG. 3 may be carried out by locating the page table entry that associates a page number with the frame number for the frame in the memory module selected for powering down and associating the page number with the frame number for the new frame in the memory module not selected for powering down. When the content of each frame in the selected memory module are moved (306) to other memory modules, each frame may be processed as described above in an atomic transaction to ensure that a process does not access the content of a frame that is mapped to that process' virtual memory space after the contents of the frame have been moved to a new frame but before the page table has been updated to reflect the move.

When a frame in the selected module having contents moved a new frame in another memory module is referenced in a TLB and cache memory, the TLB and cache memory are also typically updated to reflect that the content of the frame is moved to another memory module. As mentioned above, the TLB is a table that stores a subset of the entries in the page table, typically the most recently accessed entries in the page table by the virtual memory subsystem, for faster access than is normally achieved when accessing entries from the page table. Similarly, the cache memory stores the contents for a subset of the frames of main memory for faster access by the CPU than is normally achieved when accessing frame contents from main memory.

When a frame in the selected module having contents moved a new frame in another memory module is referenced in the TLB or the cache memory, the operating system (154) may move (306) the content of the selected memory module to other memory modules by adjusting (324) entries in a TLB as needed to reflect the use of the new frame as storage for the contents of the frame in the selected memory module and adjusting (326) entries in cache memory as needed to reflect the use of the new frame as storage for the contents of the frame in the selected memory module. Adjusting (324) entries in a TLB according to the method of FIG. 3 may be carried out by scanning the TLB for an entry that specifies the frame number for the frame in the memory module selected to be powered down and replacing the frame number in the TLB entry with the frame number for the new frame into which the contents were moved. Adjusting (326) entries in cache memory according to the method of FIG. 3 may be carried out by scanning the cache for an entry that specifies the frame number for the frame in the memory module selected to be powered down and replacing the frame number in the cache entry with the frame number for the new frame into which the contents were moved.

The method of FIG. 3 then repeats (334) the method of moving (306) the contents of the memory module selected to be powered down to other memory module as described above. Repeating (334) the method of moving (306) the contents of the memory module selected to be powered down to other memory module occurs for each frame in the selected memory module having a valid entry in the page table.

Exemplary embodiments of the present invention are described largely in the context of a fully functional computer system for managing power consumption in a computer. Readers of skill in the art will recognize, however, that the present invention also may be embodied in a computer program product disposed on computer media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power consumption in a computer, the computer comprising random access memory ('RAM') implemented in two or more memory modules, the method implemented by an operating system of the computer at the behest of a power management module of the computer, the method comprising:
    freeing at least an amount of allocated memory in one memory module from one or more other memory modules;
    selecting at least one memory module to power down;
    moving content of the selected memory module to other memory modules; and
    powering down the selected memory module.

2. The method of claim 1 further comprising determining, by the power management module in dependence upon system performance of the computer, whether to power down a memory module.

3. The method of claim 1 wherein freeing at least the amount of allocated memory in one memory module further comprises:
    invalidating entries in a page table for a number of frames whose combined size is at least the amount of allocated memory in one memory module; and
    for each page table entry number so invalidated, writing the contents of a corresponding frame to disk if the contents were changed since the contents were stored in the corresponding frame.

4. The method of claim 1 wherein selecting at least one memory module to power down further comprises selecting a memory module that bears, in comparison with other memory modules, a largest amount of free memory after freeing, from one or more of the memory modules, at least the amount of allocated memory in one memory module.

5. The method of claim 1 wherein moving content of the selected memory module to other memory modules further comprises, for each frame in the selected memory module having a valid entry in a page table:
    selecting, from a list of free frames, a new frame from a memory module other than the selected memory module;
    copying to the new frame the contents of a frame in the selected memory module; and
    replacing in the page table the frame number of the frame in the selected module with the frame number of the new frame.

6. The method of claim 1 wherein moving content of the selected memory module to other memory modules further comprises, for each frame in the selected memory module having a valid entry in a page table:
    adjusting at least one entry in a translation lookaside buffer as needed to reflect the use of the new frame as storage for the contents of the frame in the selected memory module; and
    adjusting at least one entry in cache memory as needed to reflect the use of the new frame as storage for the contents of the frame in the selected memory module.

7. The method of claim 1 wherein powering down the selected memory module further comprises instructing a memory management unit of the computer to remove the selected memory module from use.

8. A computer for managing power consumption, the computer comprising random access memory ('RAM') implemented in two or more memory modules, the computer having installed upon it an operating system, the operating system including a power management module, the computer comprising a computer processor operatively coupled to the RAM, the RAM having disposed within it computer program instructions capable of:
    freeing at least an amount of allocated memory in one memory module from one or more other memory modules;
    selecting, by the operating system, at least one memory module to power down;
    moving, by the operating system, content of the selected memory module to other memory modules; and
    powering down, by the operating system, the selected memory module.

9. The computer of claim 8 wherein the RAM has disposed within it computer program instructions capable of determining, by the power management module in dependence upon system performance of the computer, whether to power down a memory module.

10. The computer of claim 8 wherein freeing at least the amount of allocated memory in one memory module further comprises:

invalidating entries in a page table for a number of frames whose combined size is at least the amount of allocated memory in one memory module; and for each page table entry number so invalidated, writing the contents of a corresponding frame to disk if the contents were changed since the contents were stored in the corresponding frame.

11. The computer of claim 8 wherein selecting at least one memory module to power down further comprises selecting a memory module that bears, in comparison with other memory modules, a largest amount of free memory after freeing, from one or more of the memory modules, at least the amount of allocated memory in one memory module.

12. The computer of claim 8 wherein moving content of the selected memory module to other memory modules further comprises, for each frame in the selected memory module having a valid entry in a page table:

selecting, from a list of free frames, a new frame from a memory module other than the selected memory module;

copying to the new frame the contents of a frame in the selected memory module; and replacing in the page table the frame number of the frame in the selected module with the frame number of the new frame.

13. A computer program product for managing power consumption in a computer, the computer comprising random access memory ('RAM') implemented in two or more memory modules, the computer having installed upon it an operating system, the operating system including a power management module, the computer program product disposed in a computer readable, recordable medium, the computer program product comprising computer program instructions capable of:

freeing at least an amount of allocated memory in one memory module from one or more other memory modules;

selecting, by the operating system, at least one memory module to power down;

moving, by the operating system, content of the selected memory module to other memory modules; and powering, by the operating system, down the selected memory module.

14. The computer program product of claim 13 further comprising computer program instructions capable of determining, by the power management module in dependence upon system performance of the computer, whether to power down a memory module.

15. The computer program product of claim 13 wherein freeing at least the amount of allocated memory in one memory module further comprises:

invalidating entries in a page table for a number of frames whose combined size is at least the amount of allocated memory in one memory module; and for each page table entry number so invalidated, writing the contents of a corresponding frame to disk if the contents were changed since the contents were stored in the corresponding frame.

16. The computer program product of claim 13 wherein selecting at least one memory module to power down further comprises selecting a memory module that bears, in comparison with other memory modules, a largest amount of free memory after freeing, from one or more of the memory modules, at least the amount of allocated memory in one memory module.

17. The computer program product of claim 13 wherein moving content of the selected memory module to other memory modules further comprises, for each frame in the selected memory module having a valid entry in a page table:

selecting, from a list of free frames, a new frame from a memory module other than the selected memory module;

copying to the new frame the contents of a frame in the selected memory module; and replacing in the page table the frame number of the frame in the selected module with the frame number of the new frame.

18. The computer program product of claim 13 wherein moving content of the selected memory module to other memory modules further comprises, for each frame in the selected memory module having a valid entry in a page table:

adjusting at least one entry in a translation lookaside buffer as needed to reflect the use of the new frame as storage for the contents of the frame in the selected memory module; and adjusting at least one entry in cache memory as needed to reflect the use of the new frame as storage for the contents of the frame in the selected memory module.

* * * * *